US007445055B2

(12) United States Patent
Pusateri et al.

(10) Patent No.: US 7,445,055 B2
(45) Date of Patent: Nov. 4, 2008

(54) TRIGGER-ACTUATED TIP-TYPE AIR VALVE WITH INTEGRATED WEAR SURFACE

(75) Inventors: Daniel S. Pusateri, Grayslake, IL (US); James R. Brehm, Racine, WI (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 11/592,875

(22) Filed: Nov. 3, 2006

(65) Prior Publication Data

US 2008/0105846 A1 May 8, 2008

(51) Int. Cl.
*F16K 31/44* (2006.01)

(52) U.S. Cl. ........................ 173/169; 251/228; 251/339

(58) Field of Classification Search ................. 251/339, 251/228, 229, 262–263, 237–241; 173/169
See application file for complete search history.

(56) References Cited

U.S. PATENT DOCUMENTS

| | | | | | |
|---|---|---|---|---|---|
| 3,443,646 | A | * | 5/1969 | Baker et al. | 173/169 |
| 3,854,499 | A | | 12/1974 | Sievenpiper | |
| 4,258,799 | A | | 3/1981 | Eckman | |
| 4,476,942 | A | * | 10/1984 | Elkin | 173/169 |
| 4,620,428 | A | * | 11/1986 | Kopesky | 251/65 |
| 5,205,540 | A | | 4/1993 | Clapp | |
| 5,788,219 | A | | 8/1998 | Nakajima | |
| 5,992,539 | A | | 11/1999 | Lin | |
| 6,027,099 | A | | 2/2000 | Pusateri | |
| 6,443,239 | B1 | | 9/2002 | Izumisawa | |
| 6,796,386 | B2 | * | 9/2004 | Izumisawa et al. | 173/93.5 |
| 7,032,881 | B1 | | 4/2006 | Chiang | |
| 2002/0125021 | A1 | | 9/2002 | Tseng | |
| 2002/0158102 | A1 | * | 10/2002 | Patton et al. | 227/130 |

* cited by examiner

*Primary Examiner*—John Bastianelli
(74) *Attorney, Agent, or Firm*—Barnes & Thornburg, LLP

(57) ABSTRACT

A tip valve assembly for a pneumatic tool with an integrated wear surface. The tool has a portion with an air channel bore housing. The tip valve assembly includes a first valve member having a bore and defining a valve seat about the bore and a second valve member capable of forming a seal with the valve seat. The second valve member can be tilted from the valve seat to permit air flow through the bore of the first valve member. The wear surface projects over only a portion of the cylindrical wall in the bore housing in conjunction with an edge of the second valve member that can be tilted farthest, so the second valve member does not contact the cylindrical wall of the bore housing. As an anti-rotation feature, the second valve member may have an outer periphery with a shaped recess between lobes. The first valve member may have a complementary shaped integrated wear surface disposed in the recess so the second valve member moves without internally rotating as well as not contacting the cylindrical wall of the air channel bore housing.

11 Claims, 4 Drawing Sheets

TRIGGER-ACTUATED TIP-TYPE AIR VALVE WITH INTEGRATED WEAR SURFACE

BACKGROUND

This invention relates to tip valve assemblies for a pneumatic tool, and specifically to a trigger-actuated, tip-type air valve with an integrated wear surface.

Certain power tools are pneumatically controlled. Tip valves for restricting and controlling the air flow for these pneumatic tools are known in the art. For example, U.S. Pat. No. 4,258,799 discloses an inlet control valve for a pneumatic tool having first and second valve members that are independently moveable. The first and second valve members provide restricted air flow and full air flow.

The prior art includes improved tip valves of relatively simple and economical construction. FIG. 2 shows the tip valve of U.S. Pat. No. 6,027,099 ("the '099 patent") in the closed position. U.S. Pat. No. 6,027,099, which is also owned by Snap-on Incorporated and is incorporated herein by reference, discloses a tip valve for a pneumatic tool including a first valve member having a bore (to allow airflow there through) with a central axis and defining a valve seat about the bore and a second valve member having an engaging surface engageable with the valve seat to form a substantially fluid-tight seal therewith. A stem is coupled to the second valve member and extends through the bore, with at least a portion of the stem being offset from the axis, and a valve operating member is coupled to the stem for movement between a closed position wherein the second valve member engages the valve seat to close the bore and an open position wherein the second valve member is tilted from the valve seat to open the bore to permit air flow. A spring urges the second valve member and the valve operating member to the closed position.

U.S. Pat. No. 7,032,881 ("the '881 patent") discloses a switch mechanism for a pneumatic tool including a trigger and a tip valve. As seen in FIG. 4 of the '881 patent, the device includes a bushing 60 with an annular shoulder portion 62. This bushing 60 is disposed between elements identified as a choke member 50 and a choke ring 30. The choke portion 51 presses against an abutting portion 61 of the annular shoulder portion 62 of the bushing 60 instead of pressing against the inner wall of the air passage 21. The bushing 60 is made of a harder material than the choke member 50 so that the choke member 50 will be worn before the bushing 60.

In this regard, it is important to have an integrated wear surface to protect the air channel, i.e. a cylindrical wall, or other components from wear. Based on durability, components can be constructed of different materials. Also, in certain circumstances, it is desirable to have minimal internal rotation of the second valve member of the tip valve.

SUMMARY OF THE DISCLOSURE

It is an object of the disclosure to provide a tip valve assembly for pneumatic tools. The disclosed construction is in contrast to the prior art with its trigger-actuated, tip-type air valve with an integrated wear surface that functions in conjunction with a component in the valve seat having a "projection" that guides and remains substantially in contact with the second valve member.

The present disclosure includes a trigger-actuated, tip-type air valve with integrated wear surface that operates a pneumatic tool. The disclosed trigger button is coupled to an elongated rod (i.e. 52 in the '099 patent and this disclosure). A tip valve is disposed in an air channel bore housing with a coil spring for biasing. The tip valve includes an elongated stem (42 in the '099 patent and this disclosure) that connects with the elongated rod. The tip valve interacts with a valve seat (30 in the '099 patent and this disclosure) in the bore housing to control air flow. The prior art includes a rounded projecting structure (32), which projects from one side of the valve seat, that restricts rotation (as seen in FIG. 5 of the '099 patent).

The present disclosure has a lengthened antirotation projection in a new location. The disclosed projection is also reoriented in the air channel bore housing 180 degrees displaced from the prior art projecting structure (now in conjunction with the edge of the valve member that moves more when tilting, rather than the tilting edge in contact with the valve seat) so the tilting valve member does not contact the air channel bore housing. As compared with FIGS. 6 and 7 of the '099 patent, the recess between lobes can become a squared track that fits complementarily on the longer squared antirotation projection. The squared track assures minimal internal rotation. This permits the second valve member to move (tip) without internally rotating but also not contact the air channel bore housing (to reduce wear on the housing that may cause leakage of air). As a wear surface, this reduces the wear and possible replacement of the more expensive air channel bore housing, and it prevents leakage of air through the valve.

BRIEF DESCRIPTION OF DRAWINGS

The present disclosure will be described hereafter with reference to the attached drawings, which are given as a non-limiting example only, in which.

Figure 1:
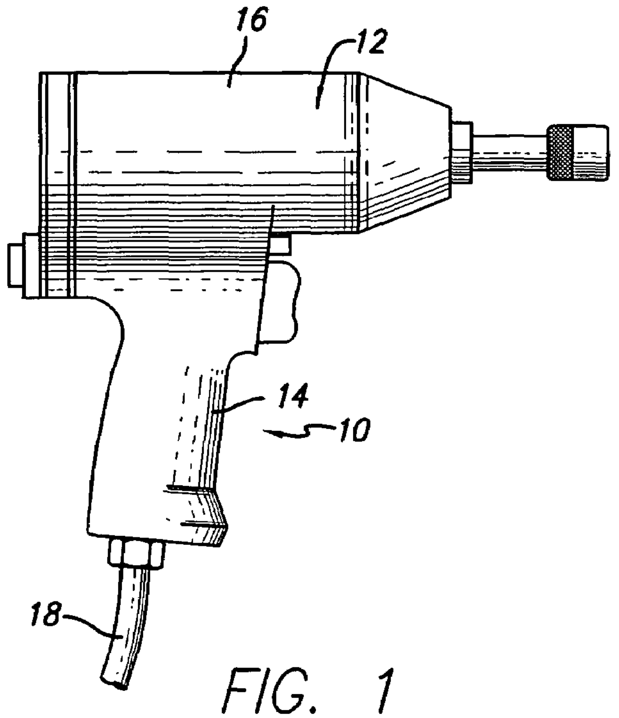
FIG. 1 is a side elevational view of the pneumatic tool of the present disclosure.

The exemplification set out herein illustrates embodiments of the disclosure that is not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, the drawings show, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

As shown in FIG. 1, a pneumatic tool, such as an impact wrench 10, includes a body 12 that includes a hand grip portion 14 and a motor housing portion 16. The motor (not shown) of the impact wrench 10 is run in a known manner by compressed air, which is supplied through an external air line 18 connected to an air source (not shown) and through a cylindrical air channel 20 formed by a cylindrical wall 21 preferably within the hand grip portion 14.

Figure 2:
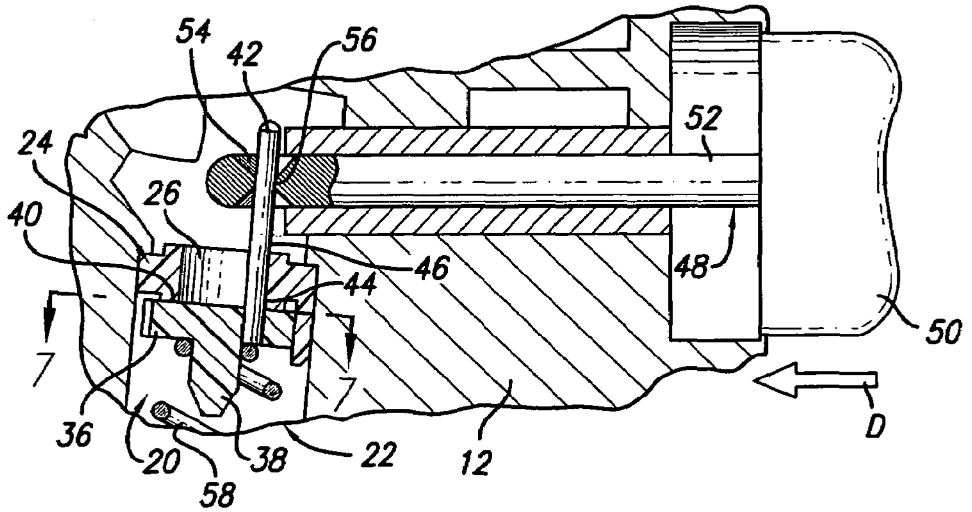
FIG. 2 PRIOR ART
FIG. 2 shows a prior art fragmentary, sectional view of the tip valve in the closed position of FIG. 4 of U.S. Pat. No. 6,027,099.

FIG. 2 shows a prior art fragmentary, sectional view of a tip valve 22 in the closed position. Where possible, the same reference numerals are used to refer to the same component in the present disclosure. A tip valve 22 is provided to control the amount of air delivered to the motor. The tip valve 22 includes a first valve member 24 fixed in the upper end of air channel 20 by a friction fit or the like. The first valve member 24 includes a central bore 26 having a central axis. The first valve member 24 has a bottom end 28 that defines a valve seat 30 about the bore 26.

The tip valve 22 also includes a second valve member 34 having a central axis, an upper lobed portion 36 and a bullet-shaped lower portion 38 depending axially therefrom. The upper lobed portion 36 has a substantially planar engaging surface 40 engageable with the valve seat 30 to form a substantially air-tight seal.

The tip valve 22 also includes an elongated stem 42 (which may be straight or bent) that is preferably eccentrically mounted. Coaxial mounting of the elongated stem 42 in the second valve member 34 is possible, but not preferred. The elongated stem 42 preferably has an axis offset from and parallel to the central axis of the second valve member 34. The elongated stem 42 has a first end 44 coupled to or imbedded in the second valve member 34 and a second end 46 disposed through the bore 26.

The tip valve 22 further includes an operating member 48 that includes a trigger button 50 projecting outside the body 12 and coupled to an end of an elongated rod 52. The elongated rod 52 is pivotally attached to the elongated stem 42. Ideally, the elongated rod 52 includes a hollow 54 at the end opposite the trigger button 50. The hollow 54 is preferably chamfered at both its ends and has a narrower diameter central portion 56. The operating member 48 is engageably coupled to the elongated stem 42, which is disposed through the hollow 54.

Figure 4:
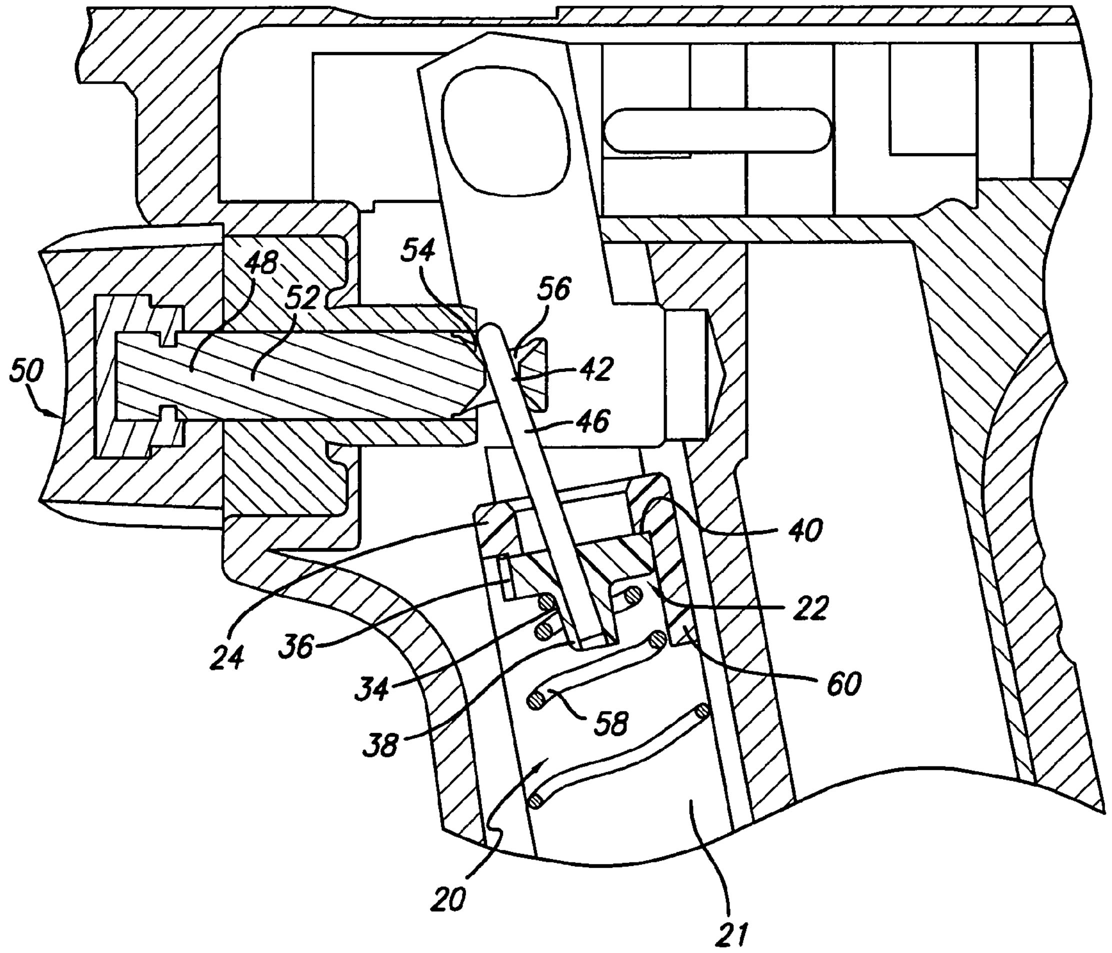
FIG. 4 is an enlarged, fragmentary, side elevational view of the handle of the tool of the disclosure, partially broken away and partially in section to illustrate the tip valve in the closed position.
Figure 5:
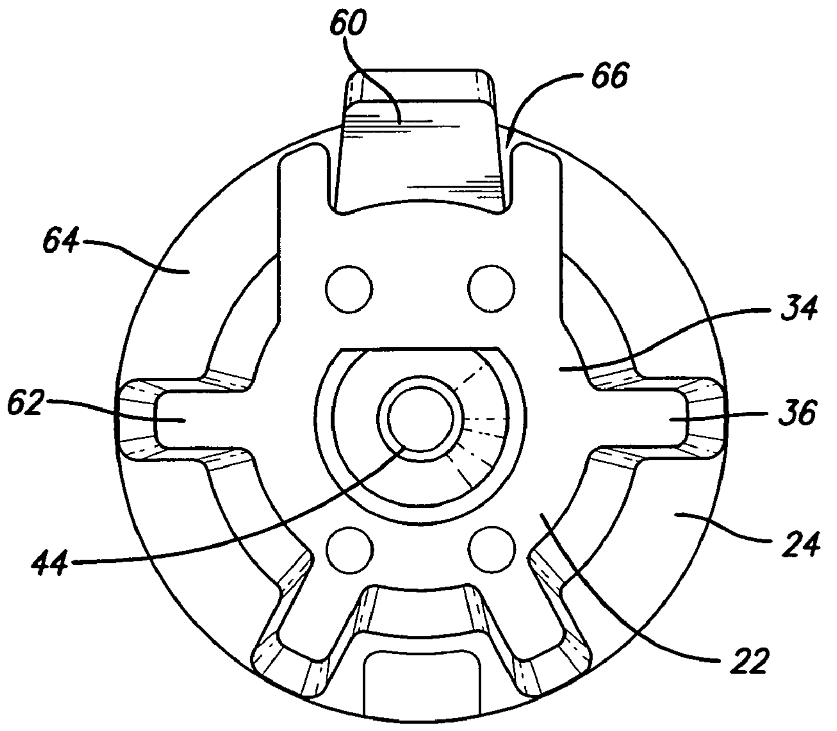
FIG. 5 is a view taken generally up the air channel (no spring shown)
Figure 6:
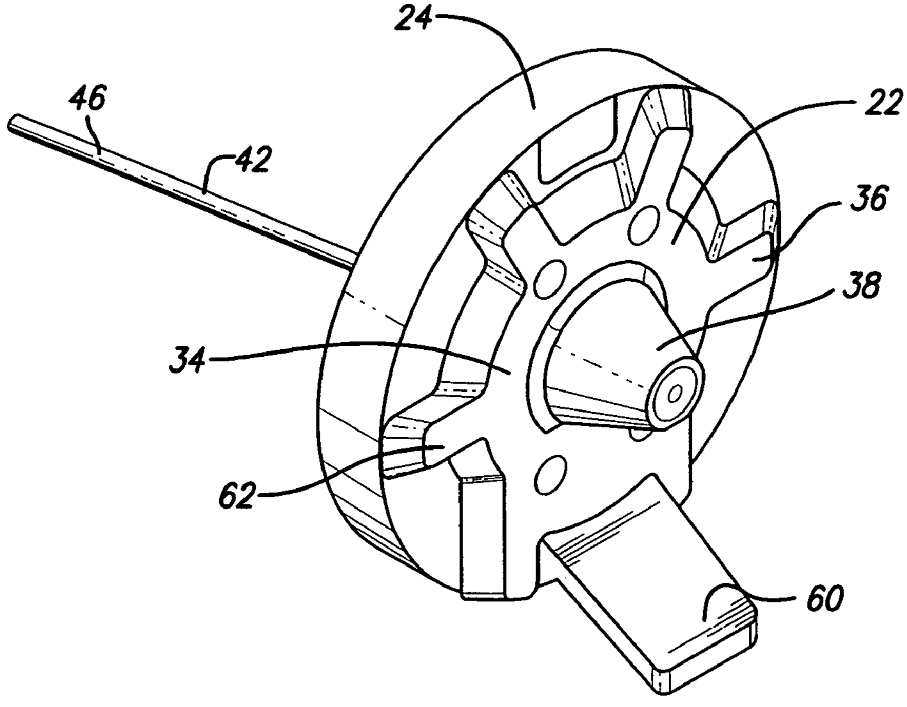
FIG. 6 is a perspective view of the tip valve.

The tip valve 22 also includes a resilient structure, such as a coil spring 58 disposed in the air channel 20 of the body 12 and about the lower portion 38 of the second valve member 34 for biasing the valve closed. As seen in FIG. 4, the coil spring 58 urges the engaging surface 40 of the second valve member 34 into engagement with valve seat 30 to form a substantially air-tight seal therebetween, the elongated stem 42 coupled to the elongated rod 52 maintains the operating member 48 in the closed position. When the operating member 48 is in the closed position, the elongated stem 42 is preferably offset from the central axis of the bore 26 and is disposed between axis and the trigger button 50.

Figure 3:
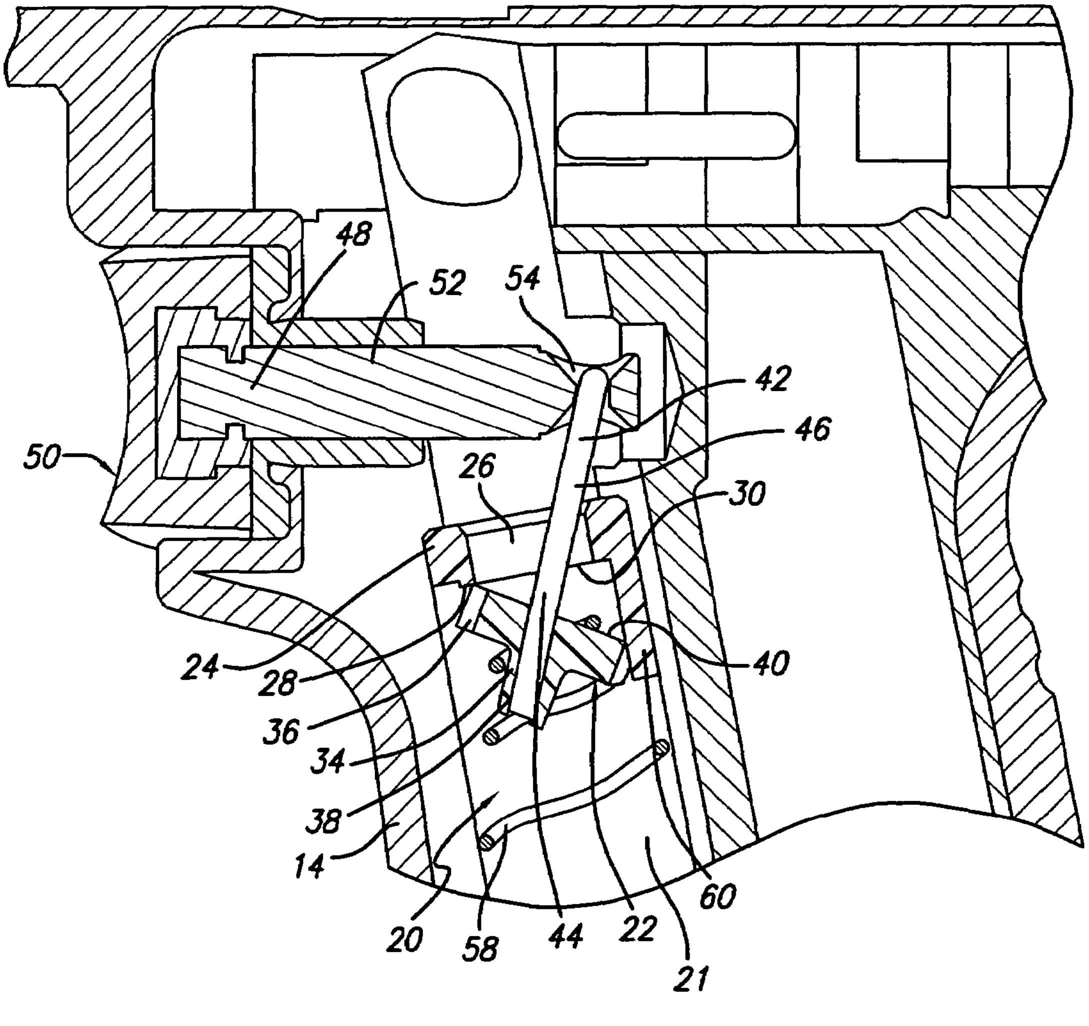
FIG. 3 is an enlarged, fragmentary, side elevational view of the handle of the tool of the disclosure, partially broken away and partially in section to illustrate the tip valve in the open position.

The operating member 48 is moveable from the closed position in FIG. 4 to an open position as shown in FIG. 3. A user simply squeezes the trigger button 50, such as toward the hand grip portion 14, which causes the elongated rod 52 to move in the same direction and causes the elongated stem 42 coupled thereto to tip the engaging surface 40 of the second valve member 34 away from the valve seat 30 to allow air to flow through the bore 26 to power the pneumatic motor. If the elongated stem 42 is preferably offset from the axis of the second valve member 34, it allows the engaging surface 40 to be tipped at least 30 degrees away from the plane of the valve seat 30 to reduce restriction of air flow through bore 26 by the second valve member 34. When the angle formed between the plane of the engaging surface 40 and the plane of the valve seat 30 is greater than about 30 degrees, the second valve member 34 substantially does not restrict air flow through the bore 26.

The first valve member 24 includes an integrated wear surface 60 that extends from bottom end 28 of the first valve member 24 adjacent the cylindrical wall 21. Ideally, the integrated wear surface 60 projects out over only a portion of the cylindrical wall 21. The integrated wear surface 60 is located in conjunction with the edge of the second valve member 34 that moves more when tilting (rather than the tilting edge in contact with the valve seat 30 at an apex) so the tilting second valve member 34 does not contact the cylindrical wall 21. The integrated wear surface 60 may function in conjunction as a component in the valve seat 30 having a "projection" that substantially remains in contact with the second valve member 34 so the upper lobed portion 36 does not contact the cylindrical wall 21. As a wear surface, this reduces the wear and possible replacement of the more expensive cylindrical wall 21, and it prevents leakage of air through the valve.

The integrated wear surface 60 may also serve as an anti-rotation projection to prevent the second valve member 34 and elongated stem 42 from rotating. The integrated wear surface 60 may also guide the upper lobed portion 36. The outer periphery of the upper lobed portion 36 forms a plurality of lobes 62 with recesses 64, including one or more squared recesses 66. The recesses 64 are between the upper lobed portion 36 and the cylindrical wall 21. The squared recess 66 between certain lobes 62 can become a squared track that fits complementarily with the integrated wear surface 60, which in this embodiment is a squared antirotation projection. The squared track assures minimal internal rotation. This permits the second valve member 34 to move (tip) without internally rotating but also not contact the cylindrical wall 21 (to reduce wear on the housing that may cause leakage of air).

With the second valve member 34 contacting the integrated wear surface 60 rather than the cylindrical wall 21, the cylindrical wall 21 can be constructed of light-weight materials, such as magnesium, because no grooves are worn into the cylindrical wall 21. The first valve member 24 is preferably formed of one piece of plastic including the integrated wear surface 60. The second valve member 34 is preferably formed of one piece of plastic including the upper lobed portion 36 and the bullet-shaped lower portion 38. The elongated stem 42 is preferably a metal rod. The suitable materials choices of the components are expanded due to the integrated wear surface 60.

In an alternate embodiment, the first valve member 24 includes both an integrated wear surface 60 and a projecting structure 32 as shown in U.S. Pat. No. 6,027,099 (with projecting structure ideally being longer than shown). Such an embodiment may have the integrated wear surface 60 and the projecting structure 32 to be the same dimensions so the first valve member 24 can be more easily friction fit in the air channel 20, i.e. with the cylindrical walls 21. With a symmetrical design, the first valve member 24 cannot be inserted backwards, and an insertion device can press against both the integrated wear surface 60 and a projecting structure 32 to press fit the first valve member 24 in the air channel 20.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A tip valve assembly for a pneumatic tool having a bore housing defined by a cylindrical wall that can operate as an air channel, the tip valve assembly comprising:

a first valve member having a bore and defining a valve seat about the bore;

a second valve member capable of forming a seal with the valve seat;

wherein the second valve member can be tilted from the valve seat to permit air flow through the bore;

a stem fixedly coupled to the second valve member and disposed through the bore for tilting the second valve member;

an integrated wear surface carried on the first valve member, the integrated wear surface projecting over a portion of the cylindrical wall in the bore housing in conjunction with an edge of the second valve member that can be tilted farthest, whereby the second valve member contacts and moves against the integrated wear surface and is spaced from and does not contact and move against the cylindrical wall of the bore housing wherein the tilting edge of the second valve member in contact with the valve seat is on the opposite side from the wear surface.

2. The tip valve assembly of claim 1 wherein the second valve member has an outer periphery with at least one recess between lobes.

3. The tip valve assembly of claim 2 wherein at least one recess between lobes is a shape that fits complementarily on the integrated wear surface, which is disposed in the recess, so the second valve member moves without internally rotating.

4. The tip valve assembly of claim 3 wherein at least one recess between lobes is squared and the integrated wear surface is a squared projection that guides and substantially remains in contact with the second valve member.

5. The tip valve assembly of claim 1 wherein the stem is straight.

6. The tip valve assembly of claim 1 wherein the cylindrical wall of the bore housing is made of magnesium.

7. A trigger-actuated tip valve assembly for a pneumatic tool with a bore housing defined by a cylindrical wall that can operate as an air channel, the tip valve assembly comprising:

a first valve member having a bore and defining a valve seat about the bore;

a second valve member capable of forming a seal with the valve seat;

wherein the second valve member can be tilted from the valve seat to permit air flow through the bore, the second valve member has an outer periphery with at least one squared recess therein;

an eccentrically mounted stem fixedly coupled to the second valve member and disposed through the bore for tilting the second valve member;

a resilient structure disposed in the bore housing urging the second valve member against the valve seat;

an integrated wear surface carried on the first valve member and shaped for receiving the squared recess, the wear surface projecting over only a portion of the cylindrical wall in the bore housing in conjunction with an edge of the second valve member that can be tilted farthest, whereby the second valve member contacts and moves against the integrated wear surface and is spaced from and does not contact and move against the cylindrical wall of the bore housing wherein the tilting edge of the second valve member in contact with the valve seat is on the opposite side from the wear surface.

8. The tip valve assembly of claim 7 wherein the stem is straight.

9. The tip valve assembly of claim 7 wherein the cylindrical wall of the bore housing is made of magnesium.

10. A tip valve within an air channel defined by a channel wall of a pneumatic tool comprising:

a first valve member with a central bore;

a second valve member with a surface capable of covering the central bore;

a stem coupled to the second valve member, whereby tilting movement of the stem causes the second valve member to no longer cover the central bore; and a wear surface integrally formed with and extending from the first valve member that covers a portion of the channel wall whereby the second valve member contacts and moves against the integrated wear surface and is spaced from and does not contact and move against the channel wall when moved by the stem wherein the tilting edge of the second valve member in contact with a valve seat is on the opposite side from the wear surface.

11. The tip valve of claim 10 wherein the second valve member has an outer periphery with a recess between lobes that fits complementarily on the wear surface, which is disposed in the recess, so the second valve member and the stem move without internally rotating.

* * * * *